A. S. LIMPERT

METHOD OF AND APPARATUS FOR REFRIGERATION

March 1, 1932. Re. 18,371

Original Filed Nov. 26, 1926 3 Sheets-Sheet 1

Alexander S. Limpert,
INVENTOR:

BY W. H. Swearton,
His ATTORNEY.

A. S. LIMPERT

March 1, 1932. METHOD OF AND APPARATUS FOR REFRIGERATION Re. 18,371

Original Filed Nov. 26, 1926 3 Sheets-Sheet 2

Alexander S. Limpert,
INVENTOR:

BY W. H. Swearington,
His ATTORNEY.

A. S. LIMPERT

METHOD OF AND APPARATUS FOR REFRIGERATION

March 1, 1932.

Re. 18,371

Original Filed Nov. 26, 1926 3 Sheets-Sheet 3

Alexander S. Limpert,
INVENTOR:

BY W. H. Swearton,
His ATTORNEY.

Reissued Mar. 1, 1932

Re. 18,371

UNITED STATES PATENT OFFICE

ALEXANDER S. LIMPERT, OF BAY SHORE, NEW YORK

METHOD OF AND APPARATUS FOR REFRIGERATION

Original No. 1,706,621, dated March 26, 1929, Serial No. 150,796, filed November 26, 1926. Application for reissue filed March 24, 1931. Serial No. 524,935.

This invention relates to a cooling unit or expansion chamber of refrigerating machines or systems and has for its particular objects the production of a cooling unit which is extremely compact, cheap to manufacture, highly durable and unusually efficient.

Heretofore it has been common practice to employ brine tanks in the cooling units of many refrigerating machines in order that the same would serve as efficient chilling reservoirs, thus serving to maintain a uniform temperature in a food compartment of a refrigerator. In those cases where the brine tank has been dispensed with there was a consequent lack of chilling capacity, as this function of the brine reservoir might be aptly termed, and consequently the machines under the control of an automatic thermostat would be in operation far more frequently than would be the case were a chilling reservoir, such as a brine tank, employed.

My investigations have led to the discovery of a novel form of reservoir which is far less cumbersome and objectionable than a brine tank, which possesses even greater chilling capacity than a brine tank of anywhere near the same dimensions and which, because of its high chilling capacity, is admirably adapted for the production of ice cubes and for the efficient maintenance of any desired temperature in the food chamber of the refrigerator, because of its unusual responsiveness to the temperature of the refrigerator coil embedded therein, all of which is hereinafter set forth in detail.

In the accompanying drawings, in which I have illustrated a preferred embodiment of my invention, Figure 1 designates a perspective view, partially in section, of my improved cooling unit for an ice box which is adapted to be refrigerated by means of an electrical refrigerating machine, by brine circulation or other means for vaporizing and condensing a refrigerant medium;

Figure 1:
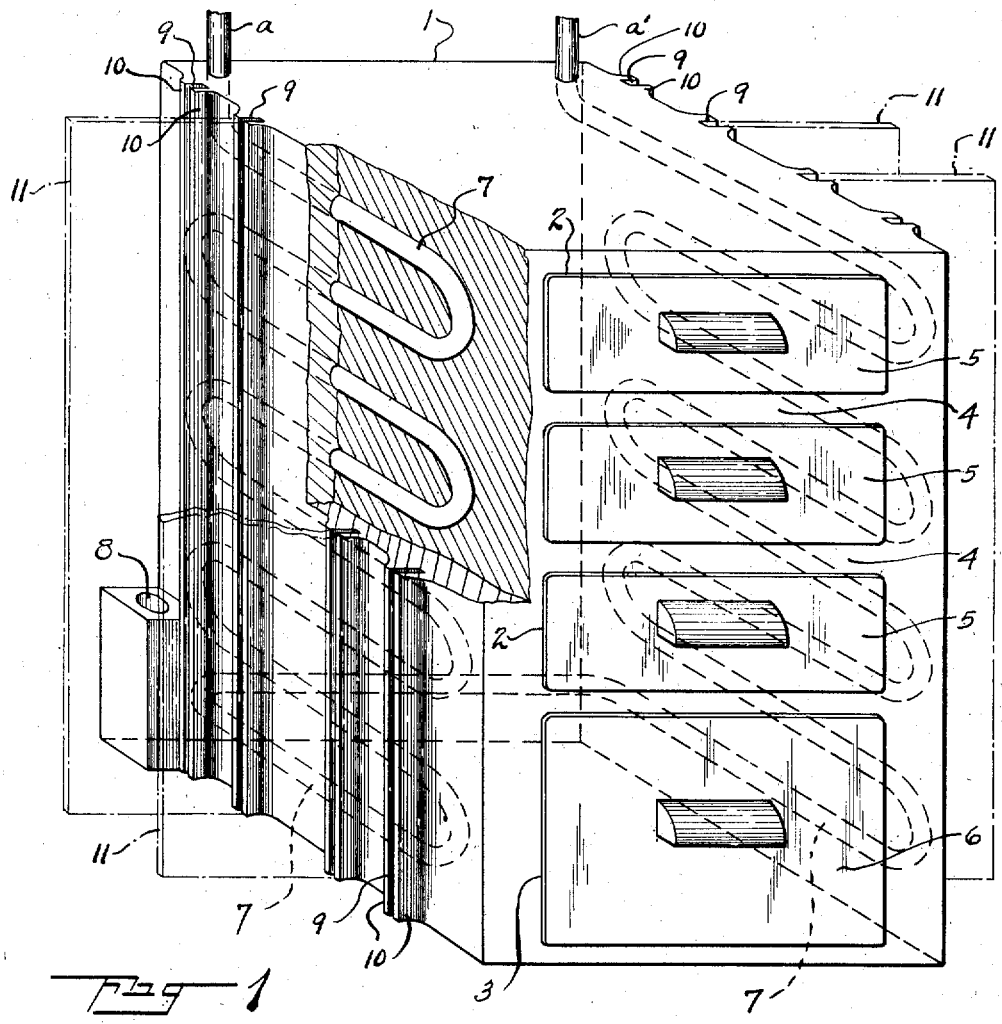
Figure 3:
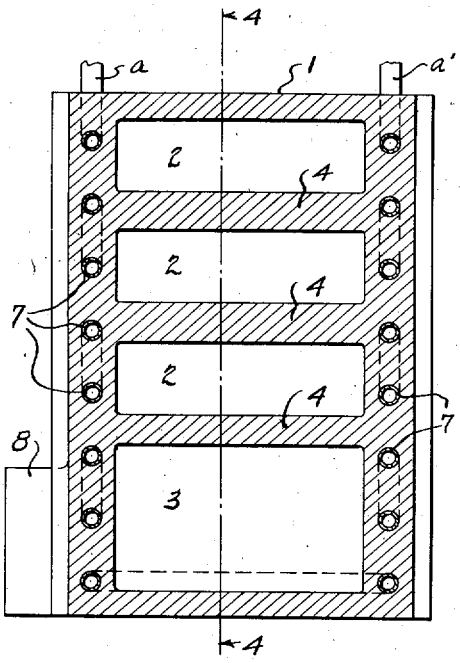
Fig. 3 a vertical transverse section on the line 3—3 of Fig. 2.
Figure 4:
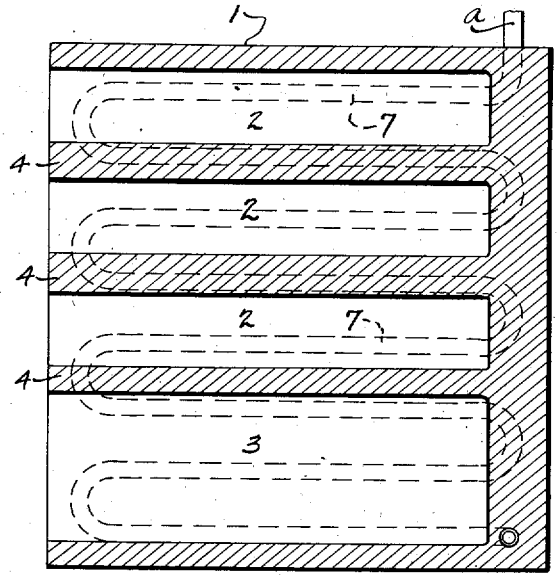
Fig. 4 is a longitudinal vertical section on the line 4—4 of Fig. 3.
Figure 2:
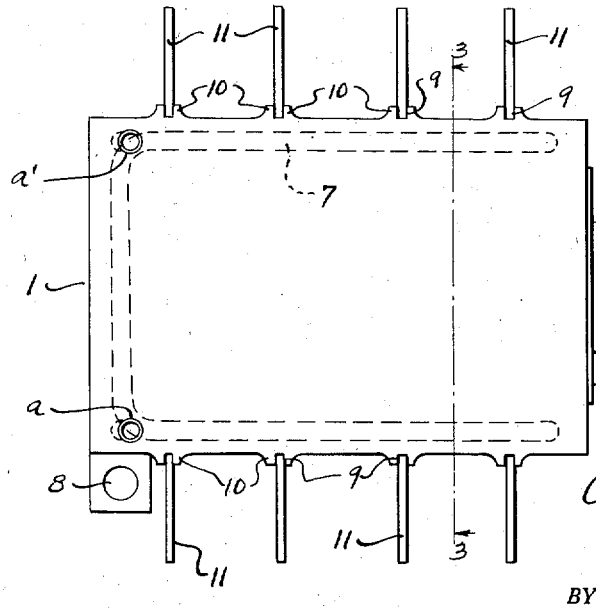
Fig. 2 is a plan view.
Figure 5:
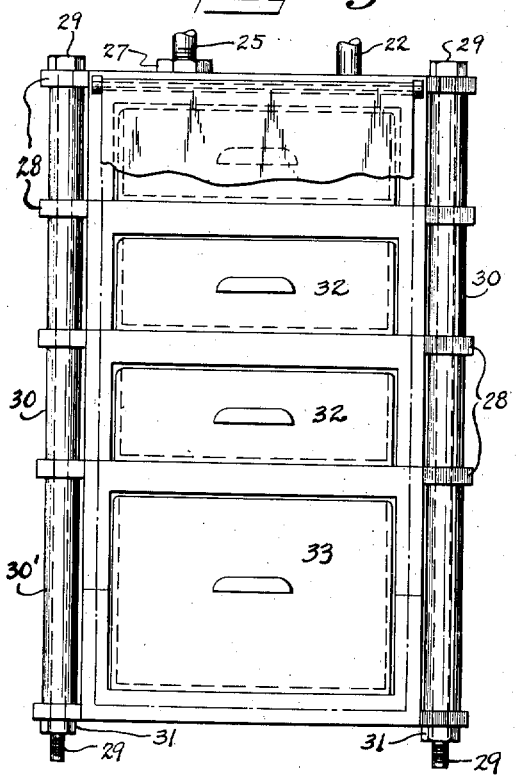
Fig. 5 is a front elevation.
Figure 7:
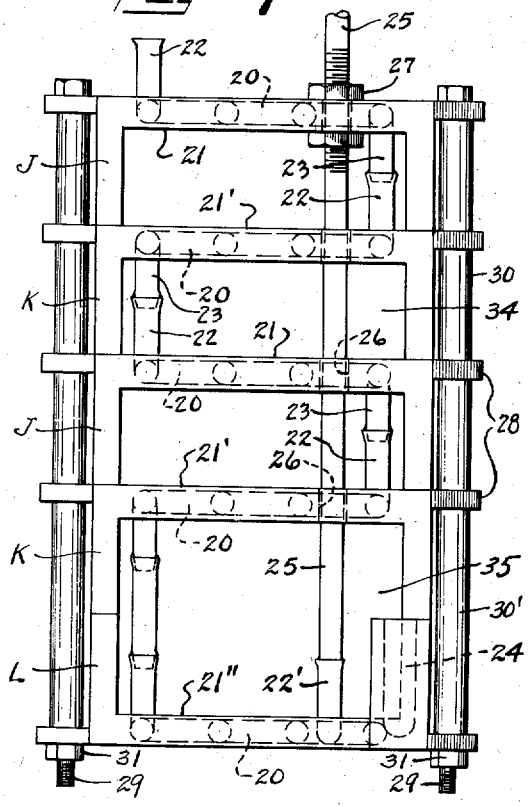

Referring to the drawings, and the construction shown therein, the reference numeral 1 designates a block formed by suitably coring a casting to provide three small chambers 2 and a large chamber 3, all separated by partitions or webs 4, which chambers are fitted with ice cube drawers or trays 5 and 6 respectively.

A thin walled coil 7 of copper or other high melting point metal is cast into the block 1 as a part thereof during the original casting operation. Said coil may obviously be of any desired shape and be embedded in the rear wall or any of the partitions between the two walls in addition to or in lieu of being embedded, as shown in the drawings, only in the side walls with an interconnecting straight section, but the construction as herein illustrated is ample for ordinary domestic refrigeration purposes.

A thermostat receptacle or well 8 is adapted to receive the thermostat which serves to control the operation of the motor of the compressor unit (not shown) and as is evident the ends $a$, $a'$ of coil 7 are adapted to be in communication with the high and low side respectively of the compressor.

The slab-like walls of the block 1 are provided with slots 9 formed between the respective pairs of lugs 10 cast thereon and these slots serve to receive and retain radiating fins 11 which preferably are snugly fitted therein and effectively held by upsetting the metal of the lugs with a prick punch or the like.

In the modification shown in Figs. 5 to 8 inclusive, the cooling element is built to any desired size by assembling a series of units each carrying its own cooling coil embedded in the cross partitions thereof. In this construction the coil 20 is cast in the partitions 21, 21′, 21″ in the manner previously described with respect to the construction shown in Figs. 1 to 4 inclusive and as shown, the coil of each section has a funnel member 22 at one end and a spout or nozzle member 23 at its opposite end which are adapted to be fitted to the dissimilar members of an adjacent section and the joint therebetween wiped with molten metal in the usual manner to securely seal the same. As will be observed, the alternate sections *j* are similar insofar as the arrangement of the coil and its terminals is concerned, whereas the alternate sections *k* are likewise similar to each other, but the lower section *l* is slightly different, the same being provided with a thermostatic well 24 and having a second funnel member 22′ at the lefthand rear corner, viewing the same from the front, and which funnel is adapted to receive and be tightly connected to a refrigerant return pipe 25, which extends through apertures 26, provided in each of the sections. Locking nuts 27 or the like serve to seal the joint between said pipe 25 and the walls of the apertures 26, besides centering said pipe therein.

Preferably in the construction of the block 1 I utilize an alloy commonly used as casting metal composed of about 97% of zinc and 3% of a mixture of aluminum and copper which melts several hundred degrees below the melting point of the copper which is utilized in the coil embedded in such metal, although in lieu of such casing metal Babbitt metal, aluminum or other suitable metal having a melting point below that of the metal employed in the coil may be substituted.

Figure 6:
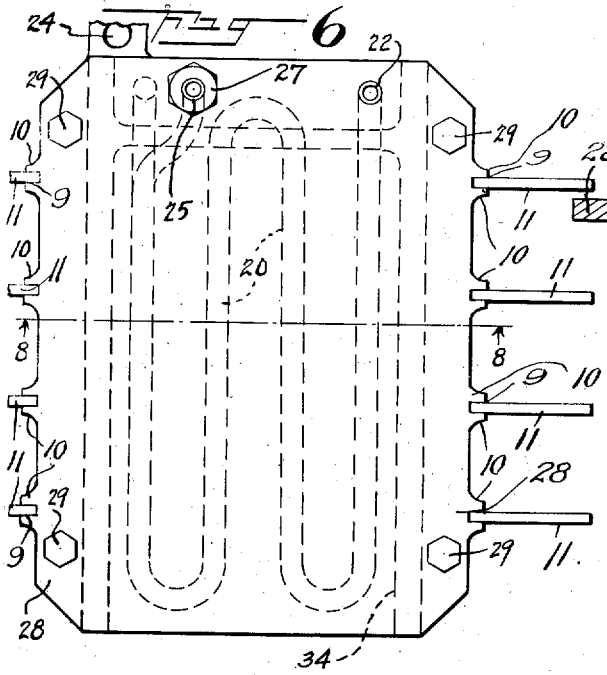
Fig. 6 is a plan view and Fig. 7 a rear elevation of a modification showing a sectional form of cooling unit which may be extended at will.
Figure 8:
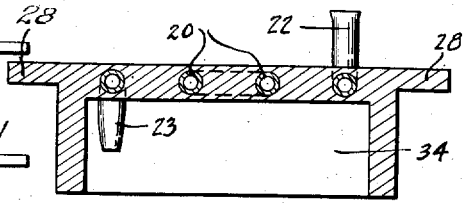
Fig. 8 is a vertical transverse section through the section next to the top, taken on the line 8—8.

As is apparent from the foregoing construction, the indefinite extension of the cooling unit is readily accomplished by means of the construction which I have provided, since, like in the assembly of a sectional book case, it is merely necessary to have the requisite number of sections of the particular kind to produce a unit of the desired capacity, namely, one top section and one or more sections corresponding to sections *j* and one or more sections corresponding to sections *k*. These units when assembled, so that their flanges 28 are in alignment on stay-bolts 29 carrying collars 30, 30′, are securely locked together by means of nuts 31. Vanes 11 may also be mounted as above described in connection with Figs. 1 to 4 inclusive in the slots 9 formed between pairs of lugs 10 which may be provided on each casting as indicated in Fig. 6.

The drawers 32, 33, are inserted in the chambers 34, 35 respectively, and these drawers may be either adapted for freezing small cubes of ice or for large cakes of ice or preserving food stuffs, as desired.

My improved cooling unit has an extremely large capacity which consequently results in minimizing the number of operations required of the compressor. It is extremely compact, it is highly responsive to and closely approximates the temperature of the coil embedded in the partitions thereof and consequently it is possible to maintain any desired temperature with a minimum expenditure of power and a minimum cost.

The extent of the radiating surface can be readily adjusted as desired and, likewise, the capacity of the unit when made in the sectional form as described can be indefinitely increased. Also because of the very thin tubing used and the manner in which the same is embedded in the metal walls, there is a minimum amount of refrigerant fluid required as compared with other machines wherein a considerable length of the heavy tubing is flooded with refrigerant or wherein a great length of refrigerant coil is embedded in a brine tank.

My improved cooling unit, as herein described, is not only highly efficient, as above stated, because of the direct conduction so that the temperature of the cooling medium is transmitted by direct conduction through the coil and the slab in which it is embedded to the chamber to be refrigerated, the same also is adapted to effect the automatic return of the lubricating oil which becomes entrained with the refrigerant and tends to collect in the bottom of the cooling unit for the reason that unlike cooling units wherein there is a brine or refrigerating chamber as distinguished from a coil, the refrigerant in my cooling unit will collect in the lowest point of the unit until a liquid seal is effected, whereupon, as the suction of the low side of the compressor builds up, the refrigerant will be suddenly sucked or puked through the coil and to the suction side of the pump, thus clearing the coil temporarily, whereas this action is impossible with machines wherein relatively large chambers for liquid refrigerant are provided.

The copper or like metal coil, although extremely thin and therefore capable of imparting the temperature of the refrigerant fluid therein to the surrounding metal, is nevertheless so reinforced by the casting in which it is embedded that not only will any pores be automatically sealed or reinforced, but there is no tendency for the same to bulge or break down because of the pressure employed in the refrigerating machine, whether the same be 50 lbs. or 200 lbs. As a consequence, it is not necessary to employ an expensive thin walled coil which has been subjected to exhaustive tests to determine the strength and porosity thereof.

Preferably the thermostatic well is provided in the bottom section, as obviously, the thermostat will then not act until the bottom pipe or slab, which will naturally be the last to cool, has reached the desired temperature and thus it will insure that all the sections have reached at least this temperature prior to the operation of the thermostat.

In the solid block construction herein described, the drawer chambers are, as illustrated, cored in the block, while the coils are embedded in the walls or partitions thereof during the casting operation and likewise, the grooves for the reception of the radial fins are cast on the outer faces of the blocks, whereby upon the insertion of the radiating fins any desired additional amount of radiation can be obtained without increasing the number of cube drawers, which ordinarily otherwise would be required and which, of course, would obviously add to the expense because of necessitating a surplus number of cube trays or drawers.

If desired, a second coil can be embedded in the wall or partition of the block comprising a cooling unit for the purpose of circulating therethrough drinking water, to be cooled, but this is only feasible where large quantities of water are to be cooled, otherwise, either the temperature of the cooling unit would have to be maintained too high for practical purposes or the water in the drinking water coils would become frozen because of insufficient circulation.

While I prefer to cast the metal tube which I employ as the cooling coil in a block of metal which has a lower boiling point because of the facility with which the same can be accomplished and the relative cheapness of the block of metal, nevertheless, in some cases I may cast a pre-formed metal tube, for example, of copper or brass in a block having substantially the same melting point and comprising a metal of the same chemical composition as that from which the tube is formed and in such case either water or oil or other suitable cooling medium is employed to radiate the heat from the tube and prevent melting thereof when the liquid metal is poured into the mold containing said tube or coil, and also the temperature of the liquid metal at the moment of pouring is preferably as low as consistent with the proper pouring thereof in order that the solidification of the metal will occur as rapidly as possible. However, for many purposes, such a procedure as above described would be too expensive, although obviously the conductivity of such a block would be far superior to that of an alloy, such as zinc alloy herein described.

Having thus described my invention, what I claim and desire to obtain by United States Letters Patent is:—

1. A sectional cooling device for refrigerating machines, comprising a plurality of dissimilar cooling units each having at least one of its walls formed of cast metal and having a pipe of a higher melting point cast integral therewith, a tubular inlet and a tubular outlet member, the respective inlet and outlet members of different units between being adapted to engage respectively the outlet and inlet members of adjacent units, and vanes removably attached to said unit.

2. A sectional cooling device for refrigerating machines, comprising a plurality of dissimilar cooling units each having at least one of its walls formed of cast metal and having a pipe of a higher melting point cast integral therewith and tubular inlet and outlet members, the respective inlet and outlet members of different units between being adapted to engage respectively the outlet and inlet members of adjacent units.

3. An expansion cooling unit for refrigerating systems, comprising a chambered vessel having side walls and a transverse wall integral with the side walls which is adapted to serve as a support for a tray containing a freezable product, at least one wall of said vessel being of metal and containing embedded therein a pre-formed tubular member of metal, which tubular member is provided with an inlet for the admission of refrigerant thereto and an outlet for the escape of refrigerant therefrom and a portion of said embedded member extending to a level substantially below the said outlet thereby forming a temporary lubricant-collecting well.

4. An expansion cooling unit for refrigerating systems, comprising a chambered receptacle of cast metal the walls thereof forming an enclosure and containing a pre-formed, metal refrigerant conduit embedded therein by a casting operation, said receptacle having a continuous transverse metal slab extending between opposite walls thereof which has intimate metal-to-metal contact with such walls whereby such slab affords a support for a tray containing a freezable product, which support is of unusual responsiveness to the temperature of refrigerant fluid in such embedded coil.

5. An expansion cooling unit for refrigerating systems, comprising a chambered receptacle of cast metal having embedded in the metal wall thereof a pre-formed metallic tubular refrigerant conduit, said receptacle having transverse integral metal partitions extending completely across the same for the reception of trays containing a freezable product, and which partitions, because of being directly united to the receptacle are peculiarly responsive to the temperature of a refrigerant fluid introduced into such conduit.

6. A sectional expansion cooling unit for refrigerating machines, comprising a plurality of heat-exchange units, each having transverse cooling surfaces for the reception of trays containing a freezable product, each of said units containing continuous looped conduits for the reception of refrigerant fluid, the conduit of one unit being connected in fluid-tight relation with the conduit of another unit and said transverse cooling surfaces being in spaced relation with respect to each other.

7. A sectional expansion cooling unit for refrigerating machines, comprising a plurality of heat-exchange units, each having a transverse cooling slab for the reception of a tray containing a freezable product, each of said transverse cooling slabs containing looped conduits for the reception of refrigerant fluid, the conduit contained in one cooling slab being directly connected to the conduit contained in the cooling slab of another unit and said cooling slabs being in spaced relation with respect to each other and means for rigidly connecting said units in assembled relation while permitting of the ready disassembly of said units at will.

8. An expansion cooling unit for refrigerating systems, comprising a chambered receptacle of cast metal and containing a preformed metal conduit embedded therein by a casting operation, metallic slabs integral with and projecting horizontally therefrom and forming supports highly responsive to the temperature of refrigerant fluid contained in said embedded conduit, whereby freezable products carried by said supports can be quickly frozen, the said conduit having an inlet for the admission of refrigerant thereto and an outlet for the escape of refrigerant therefrom, and said embedded conduit extending to a level substantially below the said outlet thereby forming a temporary lubricant-collecting well.

9. A sectional expansion cooling unit for refrigerating machines, comprising a plurality of heat-exchange units, each having a transverse cooling slab for the reception of a tray containing a freezable product, each of said transverse cooling slabs containing looped conduits for the reception of refrigerant fluid, the conduit contained in one cooling slab being directly connected to the conduit contained in the cooling slab of another unit and said cooling slabs being in spaced relation with respect to each other and said different heat-exchange units being rigidly assembled together into a unitary structure.

10. An expansion cooling unit for refrigerating systems, comprising a chambered receptacle of cast metal and containing a preformed metal conduit embedded therein, said receptacle having a well, for the reception of a thermostatic heat responsive element, cast therein.

Signed at Bay Shore, in the county of Suffolk and State of New York, this 21st day of March 1931.

ALEXANDER S. LIMPERT.